Patented Feb. 9, 1932

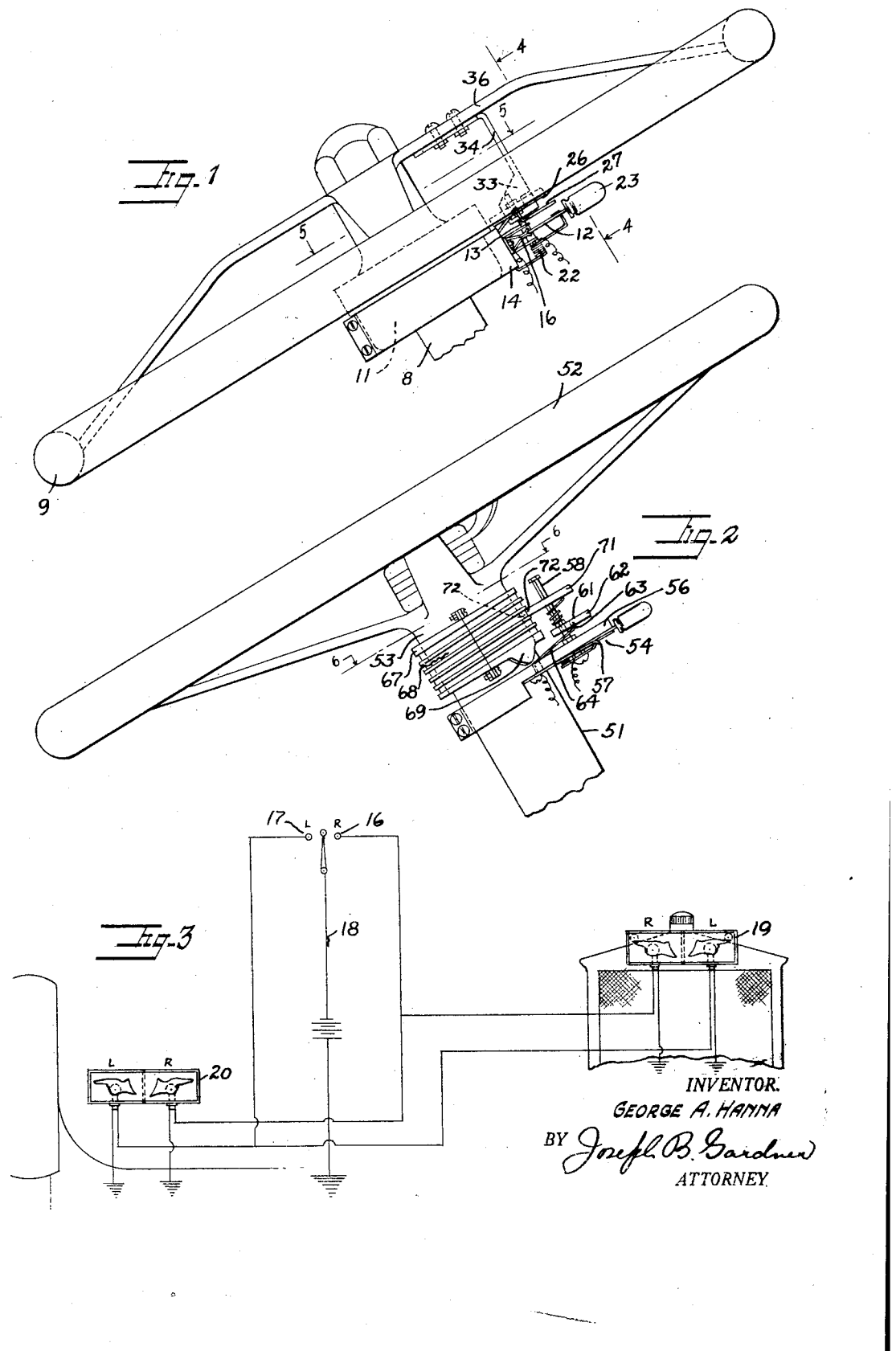

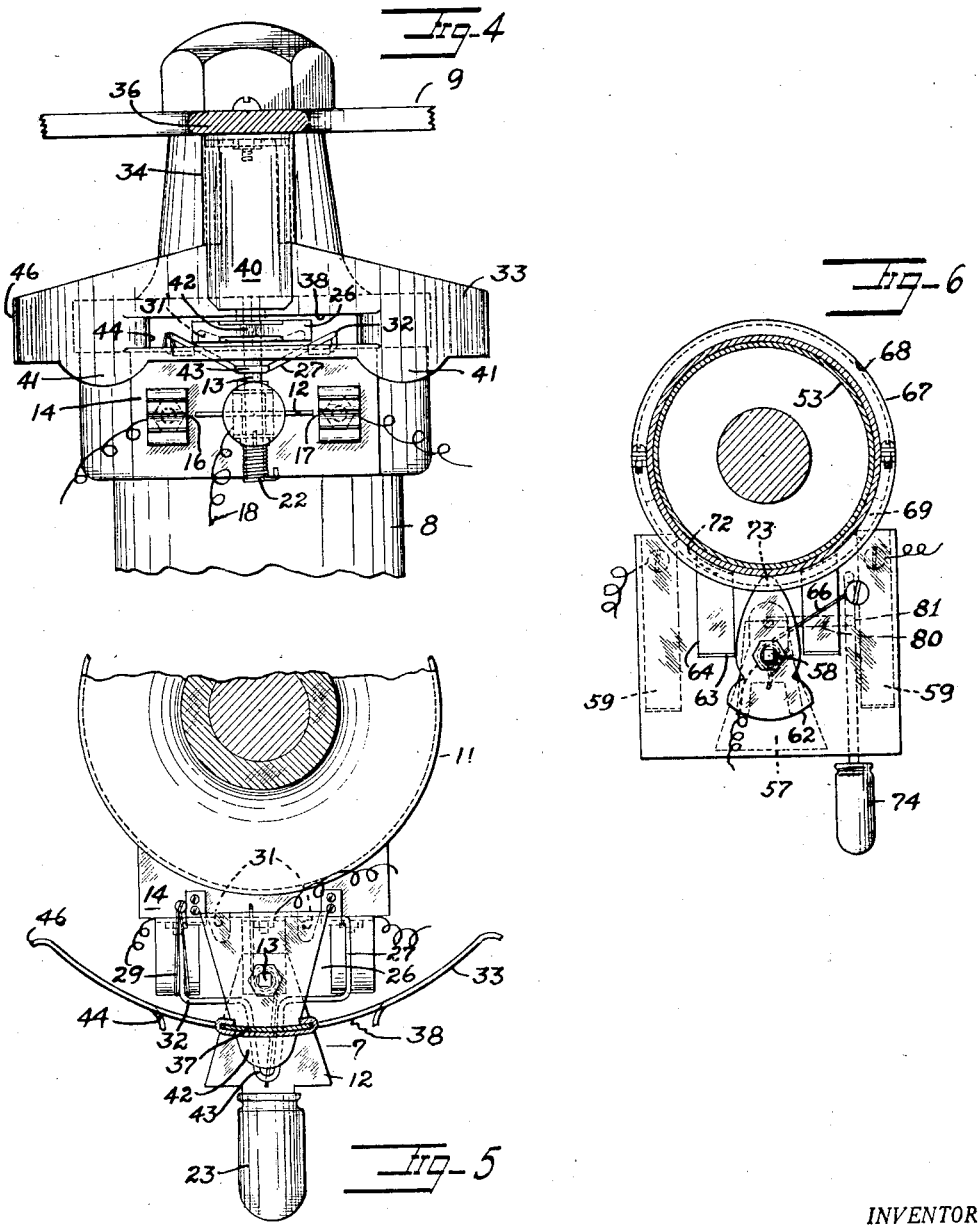

1,844,848

UNITED STATES PATENT OFFICE

GEORGE A. HANNA, OF BERKELEY, CALIFORNIA

CIRCUIT CLOSER FOR VEHICLE SIGNALS

Application filed November 1, 1926. Serial No. 145,391.

My invention particularly relates to a control means for signals for indicating a contemplated change in the direction of movement of a vehicle.

An object of the invention is to provide a novel and highly efficacious circuit closer which is particularly adapted for use with vehicle signals in that it provides for an accurate selective control thereof and also operates automatically in a particularly efficient manner whereby to insure accuracy and reliability of operation of the signal.

Another object of the invention is to provide a device of the character described which is of simple construction and is particularly adapted for installation as an attachment on vehicles of existing structure.

The invention possesses other objects and features of advantage, some of which, with the foregoing, will be set forth in the following description of the preferred form of my invention which is illustrated in the drawings accompanying and forming part of the specification. It is to be understood, however, that I do not limit myself to the showing made by the said drawings and description, as I may adopt variations of the preferred form within the scope of my invention as set forth in the claims.

Referring to said drawings,

Figure 1 is a view of one embodiment of a switch and switch operating means forming part of the device, such parts being shown operatively installed on the steering post and wheel respectively of a vehicle.

Figure 2 is a view similar to Figure 1 showing another embodiment of the switch and switch operating means.

Figure 3 is a view of the device, partly diagrammatic, showing the electric circuit and the signal means thereof.

Figures 4 and 5 are front and plan views respectively of the structure disclosed in Figure 1, taken substantially on the lines 4—4 and 5—5 respectively.

Figure 6 is a plan view of the structure shown in Figure 2, taken on the line 6—6 in such figure.

As is well known, the operators of vehicles which run on the highways are required to indicate by appropriate signal their intention to change the direction or rate of movement of the vehicle before such change is effected, whereby pedestrians or the drivers of adjacent vehicles may be warned of their intention. Furthermore, it is highly desirable that such signal be continued until the change is completed. But both the manual and mechnical means heretofore used for these purposes have usually involved the loss of the use of one hand on the steering wheel before and during the change, so that the giving of such signals has been often difficult and fraught with a certain degree of danger. In accordance with my invention, however, a means is provided whereby the desired signal may be set before starting the change and will be automatically released when, and only when, the change is completed.

Briefly, the device of my invention comprises electrically actuated signal means visible from the front and rear of a vehicle having a steering wheel, and included in an electric circuit having switch means therefor arranged to be closed manually before the change and automatically opened by and upon the return of the wheel to straight-ahead position. But since, in some makes of vehicles, the steering wheel is arranged to be revolved through considerably less than 360 degrees from the straight-ahead to either of its extreme positions, while in others such extreme rotation may be as much as 720 degrees, I have accordingly found it desirable to provide different switch operating mechanisms for the two types, whereby the device may be universally applied, it being noted that the switch structure, per se, is generally the same in either embodiment.

In the embodiment particularly illustrated in Figures 1, 4 and 5, a switch 7 is mounted on the steering post 8 associated with a steering wheel 9, which latter is of the type arranged for an extreme rotation from its straight-ahead position of somewhat less than 360 degrees. As here shown, the switch is mounted on the steering post gear-box 11 to extend generally forwardly thereof and is of the simple two-way knife-blade type, the knife 12 of the switch being fixed to a shaft 13 pivotally supported on a base member 14 preferably formed of non-conducting material, such shaft being disposed in generally parallel relation to the steering-post axis. Contacts 16 and 17 are provided for the knife, such contacts and the blade being here shown connected in a two-way control circuit 18 including signal devices 19 and 20 arranged to be respectively positioned at the front and rear of a vehicle as is indicated in Figure 3, in which figure the circuit and switch are diagrammatically indicated. The switch knife is here shown arranged to be held in intermediate position between the contacts to normally extend forwardly of the steering-post by means of a helical spring 22 operatively disposed between the knife and switch support 14, and is provided with a suitable handle 23 to facilitate its manual manipulation.

It will now be clear that when the operator of the vehicle on which the steering post is mounted desires to operate the signals to indicate his intention to turn the vehicle to the right or left, it is merely necessary to pull the switch handle in the corresponding direction to close the appropriate branch circuit and that the signal will then function as long as the switch is so held. Means are provided to hold the switch set in operative position whereby the operator's hand may be removed therefrom after it is primarily set, and as here shown, such means comprises cooperating detent members 26 and 27 provided respectively on the switch shaft 13 and the member 14. The member 27, it will be noted, is hingedly secured to the member 14 and is arranged to be resiliently urged to maintain contact with a surface 28 of the member 26 by means of a spring 29. Formed in the surface 28 of the member 26 are one or more recesses 31 in which a cooperating portion 32 of the member 27 is arranged to seat when disposed oppositely thereto. It will now be noted that the members 26 and 27 are so related that to hold the switch in a set position, it is merely necessary that when the switch knife is disposed in one of its positions to close a circuit, a recess 31 be disposed to receive a portion 32 whereby the return of the knife to open circuit position may be prevented. In this manner, the operator of the vehicle may set the switch and remove his hand, release of the switch being effected by moving the member 27 outwardly of the member 26 to release the portion 32 from the recess 31.

Means are provided to automatically effect the release of the switch when the signaled turn is completed, so that the use of the device involves only the primary setting operation on the part of the driver of the vehicle and the signal cannot remain inadvertently set. Mounted on the steering wheel is a member 33 so arranged that upon return of the wheel to its straight-ahead position, the member 27 will be disengaged from the member 26 to permit the opening of the switch. As here shown, the member 33 is mounted on a bracket 34 radially adjustably fixed to a spoke 36 of the wheel, an upwardly extending portion 37 of such member being here shown frictionally and telescopically engaged with a depending portion 40 of the bracket whereby adjustment of the position of the member 33 may be effected axially of the wheel. The member 33, it will now be noted, is generally arcuate circumferentially of the wheel and is provided with a circumferential slot 38. Formed at the bottom edge 39 of the member 33 is a pair of depending extensions 41, such extensions preferably presenting outwardly arcuate edges and being disposed generally opposite the ends of the slot and symmetrically related thereto. The switch detent members 26 and 27, it will now be noted, are provided with projections 42 and 43 respectively, which projections are respectively arranged to be engaged in and below the slot 38 centrally thereof when the switch is open and the wheel is in straight-ahead position. The projection 42 is arranged, when the switch is in one of its closed positions, to be slidably engaged by the back surface of the member 33 or by the ends of the slot while the projection 42 is arranged to always lie in the path of movement of the extensions 41.

It will now be noted that when the switch is set in one of its operative positions, the appropriate rotation of the steering wheel to effect the signalled turn will cause one of the extensions 41 to displace the projection 43 to thereby release the members 26 and 27 from their mutual engagement, such release preferably taking place at such a time that the projection 42 of the released member 26 will be caught against the end 44 of the slot 38 before the switch contact is broken. Further rotation of the wheel in the same direction will serve to swing the member 26 back to its set position through the contact thereof with the back of the member 33. By the time the projection 42 reaches the side edge 46 of the member 33, the members 26 and 27 are arranged to be re-engaged, so that the switch will remain set. On the return movement of the wheel, the detent members will be disengaged as before, but since at the time the extension 41 releases the projection 43, the recess 31 and portion 32 are not in engageable opposition, the further rotation of the wheel permits the opening of the switch so that the switch is thus automatically tripped upon the return of the wheel to straight-ahead position. It will now be noted that even if the switch is not primarily set by hand, the signal will be automatically operated while the wheel is in turned position and released at the end of the turn, the length of the slot 38 determining the degree of turning which may be effected without setting the signal. The slot ends 44 and side edges 46 are preferably provided with appropriately curved lips to facilitate the slidable engagement of the projection 42 of member 26 therewith.

The embodiment of the invention disclosed in Figures 2 and 6, it will now be noted, is particularly arranged for installation in vehicles having the steering wheels thereof arranged for operative rotation in excess of 360 degrees from the straight-ahead position. The switch mechanism provided is here shown mounted on a steering post 51 carrying a steering wheel 52 having a hub 53, and the switch portion 54 thereof is carried on a member 56 fixed to, and extending forwardly of, the steering post adjacent the hub. The switch 54, it will be noted, is also of the double-throw knife-blade type, with the blade 57 thereof fixed on a shaft 58 which is rotatably carried in the member 56 to extend axially of the steering post and upwardly along the hub 53 in spaced relation therefrom. The blade 57 is arranged to be swung upon appropriate rotation of the shaft to engage either of two contacts 59 provided on the member 56 whereby either of two signal circuits may be closed as in the previously described embodiment. Fixedly carried on the shaft 58 is a member 61 provided with a pair of detent engaging projections 62, while fixed on the member 56 is a pair of spring detents 63 so arranged that when the shaft is rotated to close a switch circuit, one of the projections 62 will be caught by a detent 63 to prevent the return rotation of the shaft. As here shown, the detents 63 are mounted on leaf spring members 64 normally sprung outwardly of the member 56, which members are arranged to permit the projections 62 to pass over the detent in only one direction, release of the engagement of a detent with a projection 62 being effected by pressing the spring 64 of an engaged detent transversely away from the engaged projection. A spring 66 is provided whereby the switch will be resiliently urged to maintain an open position.

Mounted on the wheel hub 53 is a sleeve-like member 67 having provided in the outer surface thereof a helical groove 68 and at the bottom edge thereof a pair of depending extensions 69, the extensions 69 being so positioned with respect to the detent springs 64 that when they pass thereover the springs will be depressed and the detents will thus be inoperatively disposed with respect to the projections 62, the extensions 69 thus functioning as detent releasing means. Slidably mounted on the shaft 58 for rotation therewith is a member 71, such member being arranged to be disposed radially of the steering post when the switch is open, and opposite the middle of the groove 68 when the wheel is in straight-ahead position. It will now be noted that the portion of the groove opposite the member 71 when the wheel is in straight-ahead position is deepened to provide a slot 72 and that the extremity 73 of the member is arranged to be swung freely through said slot if the shaft 58 be rotated. Furthermore, the member 71 is so shaped and proportioned that when the switch is swung to either of its closed positions, the extremity 73 thereof will slidably engage in the groove 68 so that rotation of the wheel will serve to maintain the switch in closed position except when the member 71 is actually engaged in the slot 72. The extensions 69, it will now be noted, are symmetrically disposed with respect to the slot and are generally opposite the ends thereof.

When the device is to be used, the switch knife is actuated by link 80 which is pivotally connected to the lever 74 as shown at 81, and the action of the detent means described. Then, as the wheel is turned in the appropriate turning direction, the extensions 69 act to release the detents and the switch is held closed only by virtue of the engagement of the extremity 73 of the member 71 at the end of the slot 72, a slight rotary movement of the member 71 being permitted before such engagement is effected. In this manner, return of the wheel to normal position without effecting a reengagement of the member 61 to hold the switch closed is provided for, so that the signal circuit will be open at the completion of the turn. It will be noted that the helical groove 68 functions to keep the member 71 out of operative engagement with the slot 72 except at straight-ahead position, the member 71 sliding longitudinally along the shaft 58 as the wheel is turned.

It will now be particularly noted that while the structures provided in the two embodiments of the invention herewith disclosed are different on account of the differences in the degrees of rotation of the steering wheels, their principles of operation are exactly the same. Thus, in both cases, a manually set switch is provided which is arranged to be held closed by and during the turning of the steering wheel and is arranged to be automatically opened by and upon the return of the wheel to straight-ahead position by cooperating means on the wheel and switch.

I claim:

1. In combination with a vehicle steering wheel, a normally open switch for a direction signalling circuit fixedly positioned adjacent said wheel, means manually operative to close said switch, releasable means operative to hold said switch in closed position, and means releasing said holding means and operative to hold said switch closed upon the positioning of said wheel in other than a straight-ahead position.

2. In combination with a vehicle steering wheel, a normally open switch for a direction signalling circuit fixed adjacent said wheel, means manually operable to effect a closure of such switch, detent means arranged to releasably engage and hold said switch set in closed position, and means on said wheel operative upon the rotation thereof from a straight-ahead position to release said detent means and hold said switch closed until said wheel resumes a substantially straight-ahead position.

3. In combination with a vehicle steering wheel, a normally open switch providing a circuit closing member for a direction signal circuit fixed adjacent said wheel, a shaft carrying said member and rotatable to effect the circuit closing disposal of said member to close said switch, means on said shaft for manually effecting the rotation thereof to close said switch, detent means operative upon the closing of said switch to prevent a switch opening rotation of said shaft, means on said wheel operative upon the rotation thereof to render said last means inoperative, and means other than said detent means operative through said shaft to hold said switch closed when said wheel is disposed out of its straight-ahead position and said detent means is inoperative.

4. In combination with a vehicle steering wheel, a normally open circuit closing member for a direction signal circuit fixed adjacent said wheel, means manually operable to effect the circuit closing disposal of said member when said wheel is disposed for the substantially straight-ahead travel of the vehicle, releasable means automatically operable to hold said member in circuit closing position when the manual closure thereof has been effected, means on said wheel operable to effect the release of said holding means when said wheel is out of said position, and means on said wheel operable independently of said holding means to hold said member in circuit closing position while said wheel is out of said position.

5. In combination with a vehicle steering wheel, a normally open switch for a direction signalling circuit, means manually operable to close said switch, means operable to retain said switch closed when set by said manually operable means, means automatically operable independently of said first means to close said switch and hold the same closed while said wheel is disposed out of a straight-ahead positon and to simultaneously render said second means inoperative.

6. In combination with a vehicle steering wheel, a switch member arranged to be manually set to close a circuit, means yieldingly and resiliently urging said member to maintain an inoperative position, releasable means operative to hold said member in circuit closing position when it is manually set therein, and means releasing said holding means and operative independently of said first means to hold said member in said set position upon the positioning of said wheel in other than a straight-ahead position.

7. In combination with a vehicle steering wheel, a normally inoperative pivoted switch member arranged to be manually set to close a circuit, releasable means operative to hold said member in circuit closing position when it is manually set therein, and means releasing said holding means and thereafter operative to hold said member in set position by and upon the positioning of said wheel in a vehicle turning position.

In testimony whereof, I have hereunto set my hand at Oakland, California, this 21st day of October, 1926.

GEORGE A. HANNA.